(12) United States Patent
Miura et al.

(10) Patent No.: US 10,500,924 B2
(45) Date of Patent: Dec. 10, 2019

(54) THERMAL MANAGEMENT DEVICE

(71) Applicant: DENSO CORPORATION, Kariya, Aichi-pref. (JP)

(72) Inventors: Koji Miura, Kariya (JP); Yoshiki Katoh, Kariya (JP); Kengo Sugimura, Kariya (JP); Nobuharu Kakehashi, Kariya (JP)

(73) Assignee: DENSO CORPORATION, Kariya-city, Aichi-pref. (JP)

( * ) Notice: Subject to any disclaimer, the term of this patent is extended or adjusted under 35 U.S.C. 154(b) by 52 days.

(21) Appl. No.: 15/524,401

(22) PCT Filed: Nov. 3, 2015

(86) PCT No.: PCT/JP2015/005513
§ 371 (c)(1),
(2) Date: May 4, 2017

(87) PCT Pub. No.: WO2016/079936
PCT Pub. Date: May 26, 2016

(65) Prior Publication Data
US 2017/0349030 A1 Dec. 7, 2017

(30) Foreign Application Priority Data
Nov. 19, 2014 (JP) .................................. 2014-234800

(51) Int. Cl.
*B60H 1/32* (2006.01)
*B60K 11/02* (2006.01)
(Continued)

(52) U.S. Cl.
CPC ......... *B60H 1/323* (2013.01); *B60H 1/00764* (2013.01); *B60H 1/3213* (2013.01);
(Continued)

(58) Field of Classification Search
CPC .. B60H 1/323; B60H 1/00764; B60H 1/3213; B60K 11/02; B60K 11/04; F25B 1/00; F25B 1/10
(Continued)

(56) References Cited

U.S. PATENT DOCUMENTS 6,047,770 A * 4/2000 Suzuki ............... B60H 1/00007
165/202
6,640,889 B1 * 11/2003 Harte ................. B60H 1/00885
165/202
(Continued)

FOREIGN PATENT DOCUMENTS

JP  2004074824 A   3/2004
JP  2007283830 A   11/2007
(Continued)

OTHER PUBLICATIONS

Behr, "Thermal Management Innovations for conventional and electrical vehicles", Technical Press Day 2013.

*Primary Examiner* — Raheena R Malik
(74) *Attorney, Agent, or Firm* — Harness, Dickey & Pierce, P.L.C.

(57) ABSTRACT

A thermal management device includes two or more heat dissipation devices that dissipate heat into a heat medium, a heat medium-air heat exchanger that exchanges heat between air and the heat medium having its heat dissipated in the two or more heat dissipation devices, a flow-rate adjustment device that adjusts a flow rate of the heat medium flowing through the heat dissipation device, and a control unit. The control unit controls an operation of the flow-rate adjustment device to increase the flow rate of the heat medium flowing through the one heat dissipation device, if the control unit estimates an increase in the amount of heat
(Continued)

dissipation into the heat medium at the one heat dissipation device of the two or more heat dissipation devices.

12 Claims, 12 Drawing Sheets

(51) Int. Cl.
*B60K 11/04* (2006.01)
*F25B 1/00* (2006.01)
*B60H 1/00* (2006.01)
*F25B 1/10* (2006.01)

(52) U.S. Cl.
CPC .......... *B60H 1/32284* (2019.05); *B60K 11/02* (2013.01); *B60K 11/04* (2013.01); *F25B 1/00* (2013.01); *F25B 1/10* (2013.01); *F25B 2339/047* (2013.01); *F25B 2500/26* (2013.01); *F25B 2600/0251* (2013.01)

(58) Field of Classification Search
USPC ........................................................ 165/202
See application file for complete search history.

(56) References Cited

U.S. PATENT DOCUMENTS

| | | | |
|---|---|---|---|
| 2006/0137388 A1* | 6/2006 | Kakehashi | B60H 1/323 62/513 |
| 2011/0139397 A1* | 6/2011 | Haussmann | B60H 1/00278 165/43 |
| 2012/0125593 A1* | 5/2012 | Kakehashi | F01P 3/20 165/287 |
| 2012/0216983 A1 | 8/2012 | Bennion et al. | |
| 2012/0253573 A1 | 10/2012 | Shigyo | |
| 2014/0041826 A1* | 2/2014 | Takeuchi | B60L 1/02 165/10 |
| 2014/0262195 A1 | 9/2014 | Lee | |
| 2016/0109163 A1 | 4/2016 | Enomoto et al. | |

FOREIGN PATENT DOCUMENTS

JP          2012201295 A     10/2012
WO    WO-2012144151 A1 *  10/2012  ................ B60L 1/02

* cited by examiner

THERMAL MANAGEMENT DEVICE

CROSS REFERENCE TO RELATED APPLICATIONS

This application is a U.S. National Phase Application under 35 U.S.C. 371 of International Application No. PCT/JP2015/005513 filed on Nov. 3, 2015 and published in Japanese as WO 2016/079936 A1 on May 26, 2016. This application is based on and claims the benefit of priority from Japanese Patent Application No. 2014-234800 filed on Nov. 19, 2014. The entire disclosures of all of the above applications are incorporated herein by reference.

FIELD OF THE INVENTION

The present disclosure relates to a thermal management device through which a heat medium circulates.

BACKGROUND ART

Conventionally, for example, non-patent document 1 describes a thermal management device in which an intercooler, a condenser, and a radiator are disposed in the same coolant circuit.

The intercooler is a heat exchanger that cools the intake air to the engine by dissipating heat from the intake air into a coolant. The condenser is a heat exchanger that cools a refrigerant by dissipating heat from the refrigerant into a coolant in a refrigeration cycle. The radiator is a heat exchanger that cools the coolant by exchanging heat between the outside air and the coolant having the heat exchanged in both the intercooler and condenser.

RELATED ART DOCUMENT

Patent Document

[Non-Patent Document 1] BEHR, "Thermal management-innovations for conventional and electrical vehicles," Technical Press Day 2013

SUMMARY OF THE INVENTION

According to studies by the inventors of the present disclosure, in the related art, heat dissipation into the coolant is carried out in each of the intercooler and condenser, and thereby if the amount of heat dissipation in the intercooler is large, the coolant cooling capacity of the radiator tends to become insufficient. For this reason, when the amount of heat dissipation in the intercooler is increased, the temperature of the coolant flowing into the intercooler rises, so that it might lead to insufficient intake-air cooling capacity of the intercooler, lowering the output from the engine, thus degrading the drivability of the vehicle.

The present disclosure has been made in view of the foregoing matter, and it is an object of the present disclosure to provide a thermal management device that includes two or more heat dissipation devices in the same heat medium circuit and prevents the heat dissipation capacity of one of the heat dissipation devices from becoming insufficient even when the amount of heat dissipation in one heat dissipation device is increased.

A thermal management device according to an aspect of the present disclosure includes two or more heat dissipation devices that dissipate heat into a heat medium, a heat medium-air heat exchanger that exchanges heat between air and the heat medium having heat dissipated in the two or more heat dissipation devices, a flow-rate adjustment device that adjusts a flow rate of the heat medium flowing through one heat dissipation device of the two or more heat dissipation devices, and a control unit that controls an operation of the flow-rate adjustment device to increase the flow rate of the heat medium flowing through the one heat dissipation device if the control unit estimates an increase in amount of heat dissipation into the heat medium at the one heat dissipation device.

Thus, if the amount of heat dissipation into the heat medium at one heat dissipation device can be estimated to increase, the flow rate of the heat medium flowing through the heat dissipation device is increased. Thus, when the amount of heat dissipation into the heat medium at one heat dissipation device is increased, the heat dissipation capacity of the heat dissipation device can be prevented from becoming insufficient as much as possible.

DESCRIPTION OF EMBODIMENTS

Figure 1:
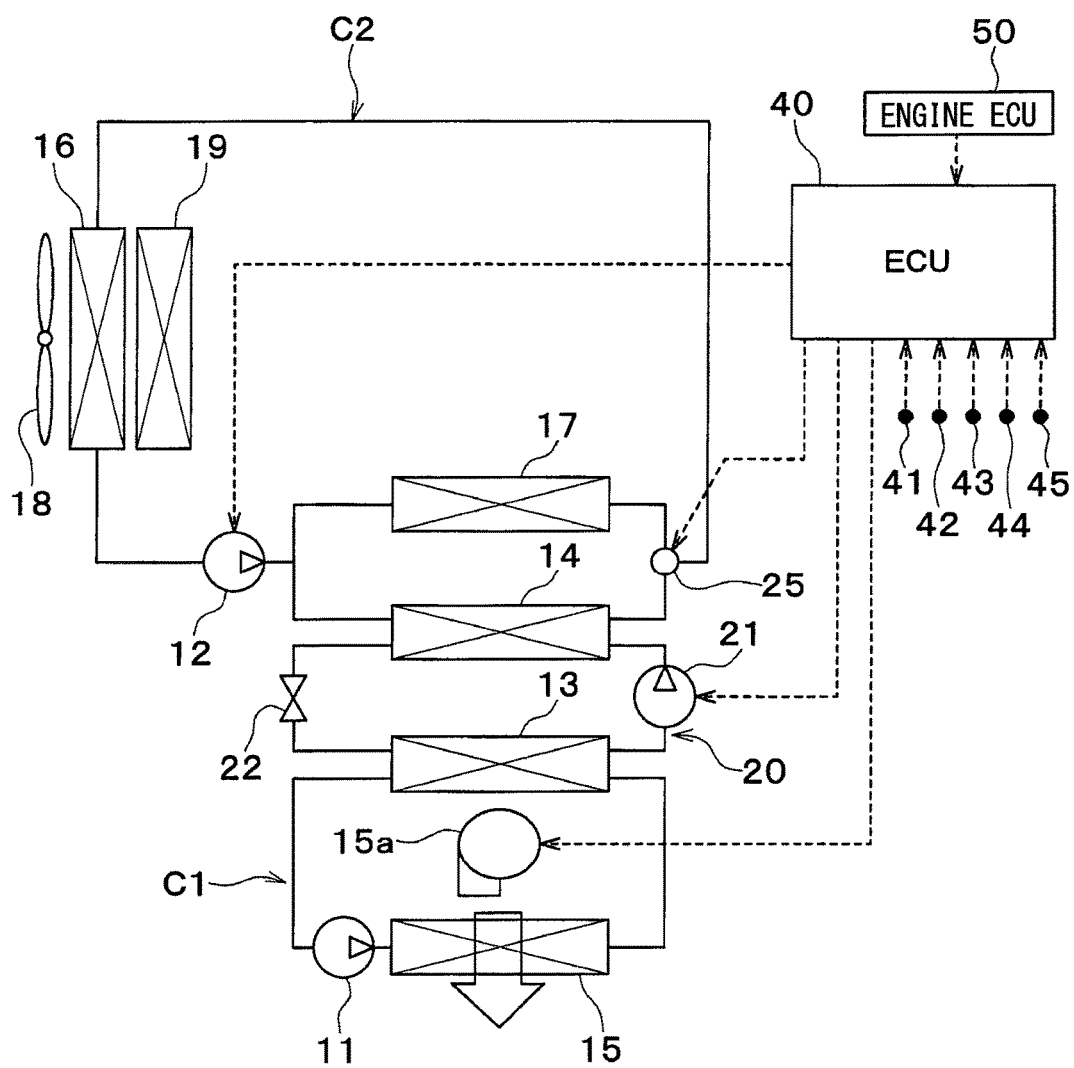
FIG. 1 is an entire configuration diagram of a vehicle thermal management device according to a first embodiment.

Embodiments will be described below with reference to the accompanying drawings. Note that in the respective embodiments below, the same or equivalent parts are denoted by the same reference characters throughout the figures.

First Embodiment

A first embodiment will be described below based on FIGS. 1 to 3. A vehicle thermal management device shown in FIG. 1 is used to adjust various devices mounted on a vehicle or an interior of the vehicle to an appropriate temperature.

The vehicle thermal management device includes a first pump 11, a second pump 12, a chiller 13, a condenser 14, a cooler core 15, a radiator 16, and an intercooler 17.

Each of the first pump 11 and the second pump 12 is an electric pump that draws and discharges a coolant (heat medium). The coolant is a fluid as the heat medium. In the embodiment, the coolant suitable for use includes a liquid containing at least ethylene glycol, dimethylpolysiloxane, or a nanofluid, or an antifreezing solution.

The chiller 13, the condenser 14, the cooler core 15, the radiator 16, and the intercooler 17 are coolant circulation devices (heat-medium circulation devices) through which the coolant circulates.

The chiller 13 is a low-pressure side heat exchanger (heat-medium cooling heat exchanger) that exchanges heat between the low-pressure side refrigerant and the coolant in a refrigeration cycle 20 to absorb heat from the coolant into the low-pressure side refrigerant, thereby cooling the coolant.

The condenser 14 is a high-pressure side heat exchanger (heat dissipation device) that exchanges heat between the high-pressure side refrigerant and the coolant in the refrigeration cycle 20 to dissipate heat from the high-pressure side refrigerant into the coolant.

The refrigeration cycle 20 is a vapor-compression refrigerator that includes a compressor 21, the condenser 14, an expansion valve 22, and the chiller 13. The refrigeration cycle 20 in the embodiment forms a subcritical refrigeration cycle in which a high-pressure side refrigerant pressure does not exceed the critical pressure of the refrigerant, using a fluorocarbon refrigerant as the refrigerant.

The compressor 21 is an electric compressor driven by power supplied from a battery, or a variable displacement compressor driven by an engine. The compressor 21 draws, compresses, and discharges the refrigerant in the refrigeration cycle 20.

The condenser 14 is a condensing device that condenses a high-pressure side refrigerant discharged from the compressor 21 by exchanging heat between the high-pressure side refrigerant and the coolant. The expansion valve 22 is a decompression device that decompresses and expands the liquid-phase refrigerant flowing out of the condenser 14. The chiller 13 is an evaporator that evaporates a low-pressure side refrigerant decompressed and expanded by the expansion valve 22 by exchanging heat between the low-pressure side refrigerant and the coolant.

The cooler core 15 is an air-cooling heat exchanger that cools air to be blown into the vehicle interior by exchanging heat between the coolant cooled by the chiller 13 and the air.

The cooler core 15 is accommodated in a casing of an interior air-conditioning unit (not shown). The interior air-conditioning unit has a function of adjusting the temperature of air blown by an interior blower 15a to blow the air into the vehicle interior (space to be air conditioned).

The interior air-conditioning unit is disposed inside a dashboard (instrumental panel) at the foremost portion of the vehicle interior. The casing forms an air passage through which the air blown by the interior blower 15a flows, while forming an outer shell of the interior air-conditioning unit.

The interior blower 15a is an electric blower that includes a centrifugal multiblade fan (sirocco fan) to be driven by an electric motor.

The radiator 16 is a heat dissipation device (heat medium-air heat exchanger) that dissipates heat from the coolant into outside air (vehicle exterior air) by exchanging heat between the coolant and the outside air. The radiator 16 is disposed in an engine room (not shown) of the vehicle. The radiator 16 receives the outside air blown by an exterior blower 18. Thus, traveling air is allowed to hit the radiator 16 during traveling of the vehicle.

The exterior blower 18 blows the outside air to the radiator 16. The exterior blower 18 is an electric blower that includes a fan driven by an electric motor. The outside air blown by the exterior blower 18 flows through the radiator 16 and an engine radiator 19 in series.

The engine radiator 19 is a heat dissipation device that dissipates heat from an engine coolant into the outside air by exchanging heat between the engine coolant and the outside air. The engine radiator 19 is disposed in an engine room of the vehicle. The engine coolant is an engine-cooling heat medium that cools the engine (not shown) of the vehicle.

The intercooler 17 is an intake air cooler (intake air-heat medium heat exchanger) that cools a high-temperature supercharged intake air compressed by a turbocharger (not shown) by exchanging heat between the coolant and the supercharged intake air. The turbocharger is a supercharger that supercharges intake air to the engine (inhaled air). The intercooler 17 is a heat dissipation device that dissipates heat from the intake air into the coolant.

The first pump 11, the chiller 13, and the cooler core 15 are disposed in a first coolant circuit C1 (first heat medium circuit). In the first coolant circuit C1, the coolant (first heat medium) circulates through the first pump 11, the cooler core 15, the chiller 13, and the first pump 11 in this order.

The second pump 12, the condenser 14, the radiator 16, and the intercooler 17 are disposed in a second coolant circuit C2 (second heat medium circuit). The condenser 14 and the intercooler 17 are disposed in parallel with the coolant flow in the second coolant circuit C2.

In the second coolant circuit C2, the coolant (second heat medium) circulates through the second pump 12, the condenser 14 and intercooler 17 (in parallel), the radiator 16, and the second pump 12 in this order.

In the second coolant circuit C2, a three-way valve 25 is disposed. The three-way valve 25 is placed in a merging portion that merges the coolant flowing through the condenser 14 and the coolant flowing through the intercooler 17. The three-way valve 25 serves to adjust the ratio of an opening degree of a coolant flow path on the condenser 14 side to that of a coolant flow path on the intercooler 17 side.

That is, the three-way valve 25 is a flow-rate ratio adjustment device that adjusts the ratio of the flow rate of the coolant flowing through the condenser 14 to that through the intercooler 17. In other words, the three-way valve 25 is a flow-rate adjustment device that adjusts the flow rate of the coolant flowing through the intercooler 17.

A control unit 40 is configured of a known microcomputer, including CPU, ROM, and RAM, and a peripheral circuit thereof. The control unit 40 performs various computations and processing based on air-conditioning control programs stored in the ROM to thereby control the operations of various control target devices that are connected to its output side.

The control target devices, including the first pump 11, second pump 12, exterior blower 18, compressor 21, three-way valve 25, and interior blower 15a, are connected to the output side of the control unit 40.

The control unit 40 incorporates therein control units (hardware and software) for controlling various control target devices that are connected to its output side and integrated together. For instance, a second pump control unit, a blower control unit, a compressor control unit, a three-way valve control unit, and the like are integrated together into the control unit 40. The second pump control unit controls the operation of the second pump 12. The blower control unit controls the operation of the interior blower 15a. The compressor control unit controls the operation of the compressor 21. The three-way valve control unit controls the operation of the three-way valve.

The control units for controlling the operations of the respective control target devices may be provided separately from the control unit 40.

Detection signals from a group of sensors are input to the input side of the control unit 40. The sensor group includes an accelerator sensor 41, a brake sensor 42, a shift sensor 43, a vehicle-speed sensor 44, and a coolant temperature sensor 45.

The accelerator sensor 41 detects an accelerator opening (the amount of the accelerator pedal pushed by the driver). The brake sensor 42 determines whether the driver is pushing a brake pedal or not. The shift sensor 43 detects a shift range of a transmission. The vehicle-speed sensor 44 detects the vehicle speed (traveling speed of the vehicle). The coolant temperature sensor 45 detects the temperature of the coolant in the second coolant circuit C2.

Various signals from an engine control unit 50 are input to the input side of the control unit 40. The engine control unit 50 controls the operation of the engine. Examples of various signals input from the engine control unit 50 to the control unit 40 include: a signal indicating an operating/stopping state of the engine; a signal indicating a throttle opening; a signal for increasing a fuel injection amount; a signal indicating an engine speed or RPM; a signal indicating the degree of an engine load; and a signal indicating the temperature of the engine coolant.

The operation of the above-mentioned structure will be described. When the control unit 40 operates the first pump 11, the second pump 12, and the compressor 21, the refrigerant circulates through the refrigeration cycle 20, while the coolant circulates through each of the first coolant circuit C1 and the second coolant circuit C2.

The chiller 13 allows the refrigerant in the refrigeration cycle 20 to absorb heat from the coolant in the first coolant circuit C1, thereby cooling the coolant in the first coolant circuit C1. The refrigerant having absorbed heat in the chiller 13 dissipates heat at the condenser 14 into the coolant flowing through the second coolant circuit C2. In this way, the refrigerant in the refrigeration cycle 20 is cooled.

The coolant in the second coolant circuit C2 receives heat dissipation from the supercharged intake air in the intercooler 17. The supercharged intake air is cooled. The coolant that receives heat dissipated from the refrigerant in the condenser 14 and the coolant that receives heat dissipated from the supercharged intake air in the intercooler 17 have their heat dissipated into the outside air in the radiator 16. The coolant in the second coolant circuit C2 is cooled.

The coolant cooled by the chiller 13 in the first coolant circuit C1 absorbs heat at the cooler core 15 from the air to be blown into the vehicle interior. The air to be blown into the vehicle interior is cooled. The air cooled by the cooler core 15 is blown into the vehicle interior. Thus, the vehicle interior is cooled.

The chiller 13 cools the air to be blown into the vehicle interior by indirectly exchanging heat between the refrigerant decompressed and expanded by means of the expansion valve 22 and the air to be blown into the vehicle interior via the coolant in the first coolant circuit C1.

Figure 2:
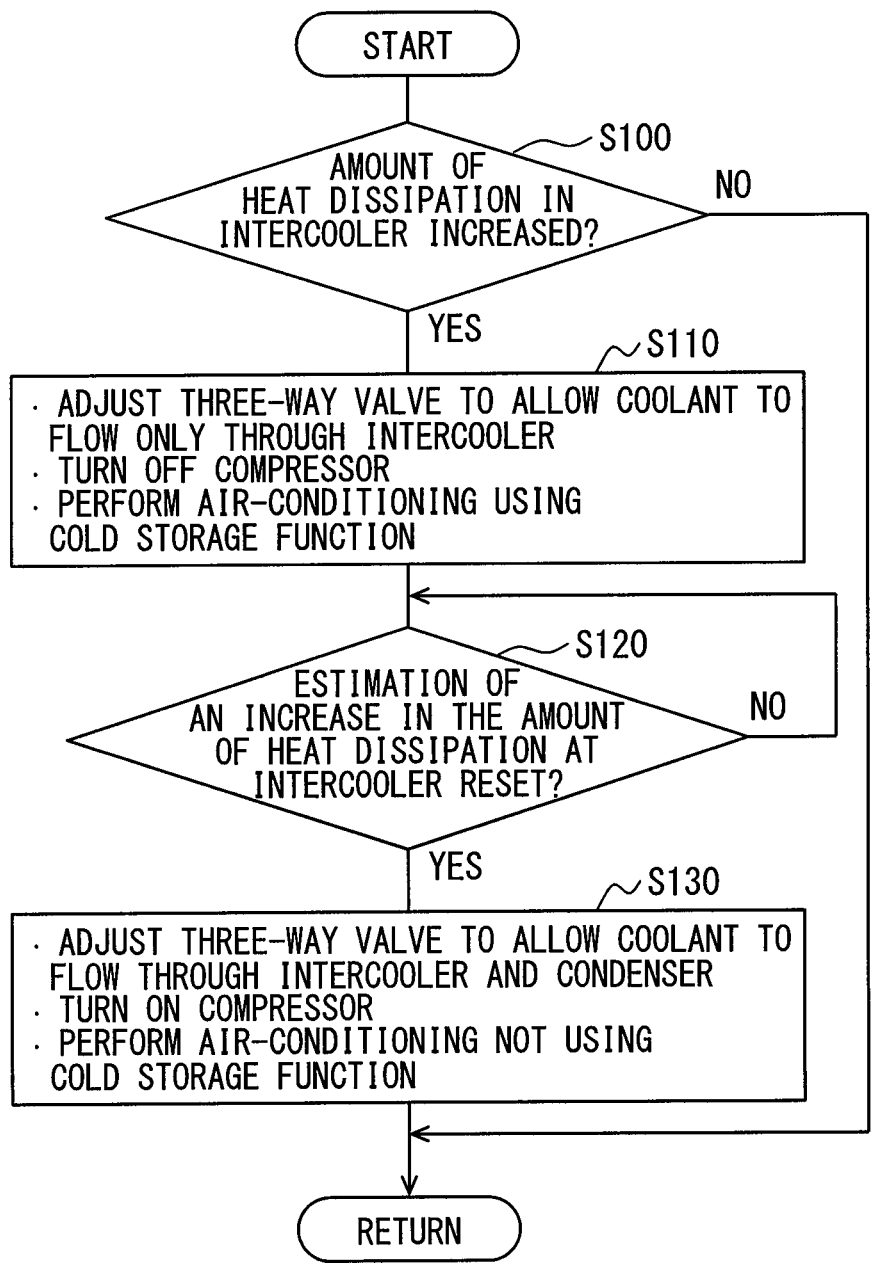
FIG. 2 is a flowchart showing control processing executed by a control unit in the vehicle thermal management device in the first embodiment.

The control unit 40 performs the control processing shown in the flowchart of FIG. 2. In step S100, first, it is estimated whether the amount of heat dissipation from the supercharged intake air into the coolant in the intercooler 17 will increase or not.

Specifically, the amount of heat dissipation in the intercooler 17 is estimated to increase when the accelerator opening is predicted to increase, or when the accelerator opening is actually increased.

The following are examples of a case in which the accelerator opening is predicted to increase: (1) when the vehicle speed is 0 km/h; (2) when the driver does not push the accelerator; (3) when the driver is pushing the brake; and (4) when the driver changes a shift range from any range other than a D range (drive range) to the D range.

Alternatively, an increase in the amount of heat dissipation in the intercooler 17 may be estimated when the engine speed, the engine torque, or the engine output is predicated to increase, or when the engine speed, the engine torque, or the engine output is actually increased.

The following are examples of a case in which the engine speed, the engine torque, or the engine output is predicted to increase: (1) when the engine control unit 50 is predicted to increase an engine throttle opening; and (2) when the engine control unit 50 is predicted to increase a fuel injection amount into the engine.

When the temperature of the coolant in the second coolant circuit C2 is raised to a threshold or higher, an increase in the amount of heat dissipation in the intercooler 17 may be estimated.

If the amount of heat dissipation in the intercooler 17 is estimated not to increase in step S100, the process in step S100 will be repeated. On the other hand, if an increase in the amount of heat dissipation in the intercooler 17 is estimated, the operation proceeds to step S110, in which intake-air cooling priority control is performed to give priority to intake-air cooling in the intercooler 17. Specifically, the following control is performed. (1) The operation of the three-way valve 25 is controlled to allow the coolant to flow through the intercooler 17 but not through the condenser 14. (2) The compressor 21 is stopped. (3) The cooler core 15 cools the air by using a cold storage function (heat capacity) of the first coolant circuit C1.

Thus, the flow rate of the coolant flowing through the intercooler 17 is increased, thereby making it possible to increase the intake-air cooling capacity of the intercooler 17. At this time, since the coolant does not flow through the condenser 14, the refrigerant cannot be cooled by the condenser 14. However, the compressor 21 can be stopped, thereby preventing an excessive rise in the refrigerant pressure in the refrigeration cycle 20.

Since the compressor 21 is stopped and the refrigerant does not flow through the chiller 13, the coolant cannot be cooled by the chiller 13. However, the air is cooled by means of the cooler core 15 by utilizing the cold storage function of the first coolant circuit C1, making it possible to maintain cooling comfort in the vehicle interior.

The cold storage function of the first coolant circuit C1 is achieved by a coolant hose (coolant pipe member) in the first coolant circuit C1, the coolant inside the chiller 13, and the coolant within the cooler core 15.

The cold storage material that stores therein the cold heat is imparted to the cooler core 15, so that the cold storage function of the first coolant circuit C1 can be enhanced. Examples of the cold storage material include paraffin and sodium acetate hydrate.

When the compressor 21 is stopped in step S130, at least one of the flow rate of the coolant through the cooler core 15 and the flow rate of the air through the cooler core 15 is preferably set lower immediately after stopping the compressor 21, and then is preferably increased as the time elapses. That is why the cold storage function of the first coolant circuit C1 becomes available for a long time of period. The reason will be described below.

Figure 3:
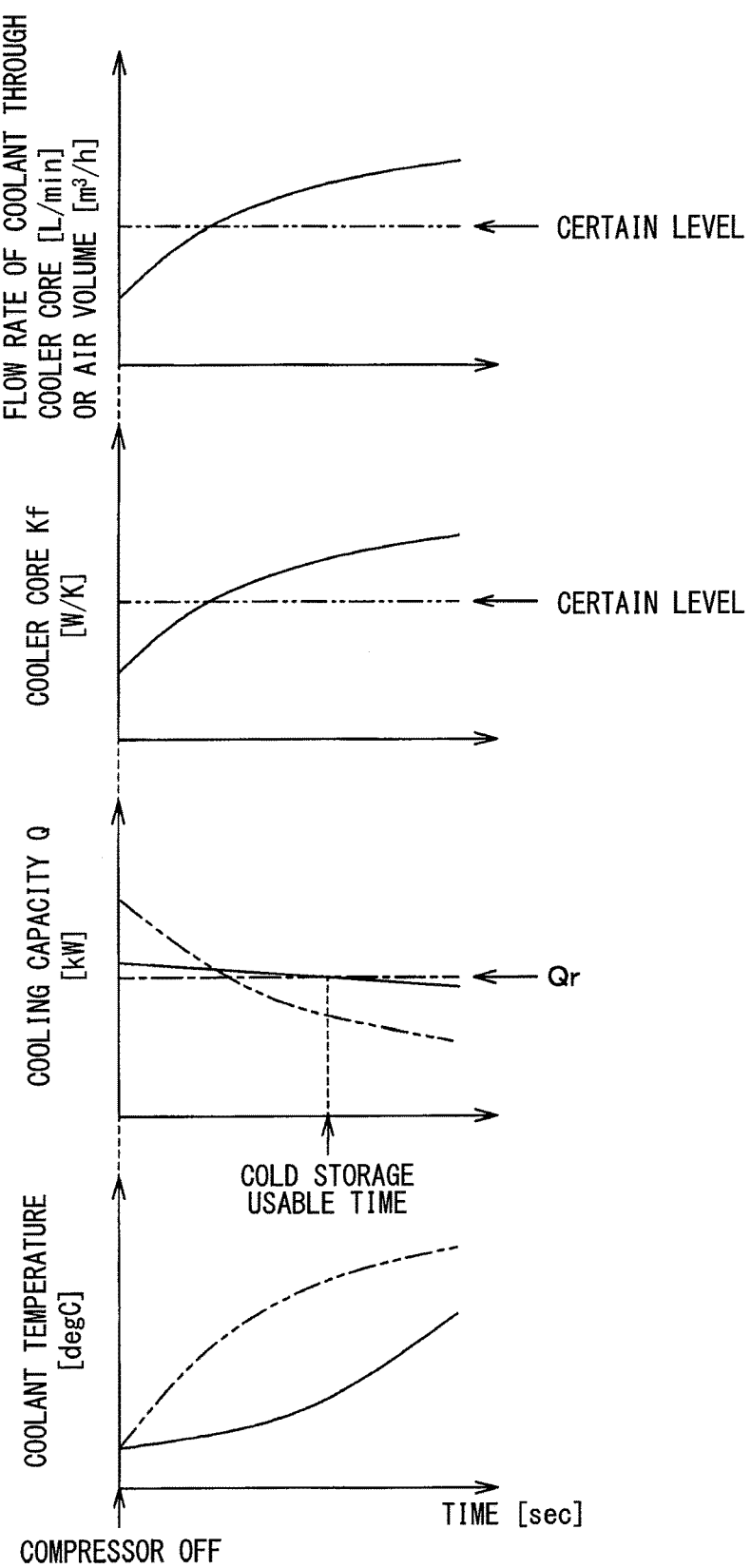
FIG. 3 shows time charts of operating results of the vehicle thermal management device in the first embodiment.

In the time charts shown in FIG. 3, the solid line indicates a case in which the flow rate of at least one of the coolant and air flowing through the cooler core 15 is increased over time, while the alternate long and two short dashed line indicates a case in which the flow rates of the coolant and air flowing through the cooler core 15 are set at certain levels.

When the flow rates of the coolant and air flowing through the cooler core 15 are set to be at certain levels, a heat transfer rate Kf in the cooler core 15 also becomes a certain value. The heat transfer rate Kf in the cooler core 15 means the amount of heat exchange per degree (° C.) of a difference in temperature between the inlet air and the inlet coolant in the cooler core 15. As the flow rate of the coolant flowing through the cooler core 15 is increased, the heat transfer rate Kf in the cooler core 15 becomes higher. As the flow rate of the air flowing through the cooler core 15 is increased, the heat transfer rate Kf in the cooler core 15 becomes higher.

When the flow rates of the coolant and the air flowing through the cooler core 15 are set at the certain levels, a cooling capacity Q of the cooler core 15 (the amount of heat exchange in the cooler core 15) is high immediately after stopping the compressor 21 because the coolant flowing into the cooler core 15 has a low temperature at this point. As the time elapses, the temperature of the coolant flowing into the cooler core 15 is raised, whereby the cooling capacity Q of the cooler core 15 becomes lower. Immediately after stopping the compressor 21, the cooling capacity Q of the cooler core 15 exceeds a required cooling capacity Qr (indicated by an alternate long and short dash line in FIG. 3) to become excessive.

While the flow rate of at least one of the coolant and air flowing through the cooler core 15 is increased over time, the heat transfer rate Kf in the cooler core 15 is low immediately after stopping the compressor 21, but also becomes higher as the time elapses.

The cooling capacity Q of the cooler core 15 can be suppressed to a smaller level immediately after stopping the compressor 21, compared with when the flow rates of the coolant and the air flowing through the cooler core 15 are set at the certain levels. Furthermore, the cooling capacity Q of the cooler core 15 can be prevented from becoming excessive, and a temperature rise of the coolant in the first coolant circuit C1 can be made slow, thus extending a time (cold-storage usable time) that can ensure the required cooling capacity Qr.

In step S120, it is determined whether the estimation performed in step S100 is reset or not. That is, it is determined whether the estimation of the increase in the amount of heat dissipation in the intercooler 17 is reset or not. In other words, it is determined whether a decrease in the amount of heat dissipation in the intercooler 17 can be estimated or not.

Specifically, the estimation of the increase in the amount of heat dissipation in the intercooler 17 is reset when the accelerator opening is decreased, or when the accelerator opening is predicted to decrease. The case in which the accelerator opening is predicted to decrease is, for example, when the driver changes a shift range from the D range (drive range) to any range other than the D range.

Alternatively, the estimation of the increase in the amount of heat dissipation in the intercooler 17 may be reset when the engine speed, the engine torque, or the engine output is predicated to decrease, or when the engine speed, the engine torque, or the engine output is actually decreased.

The following are examples of a case in which the engine speed, the engine torque, or the engine output is predicted to decrease: (1) when the engine control unit is predicted to decrease an engine throttle opening; and (2) when the engine control unit is predicted to decrease a fuel injection amount into the engine.

When the temperature of the coolant in the second coolant circuit C2 is decreased to lower than the threshold, the estimation of the increase in the amount of heat dissipation in the intercooler 17 may be reset.

If the estimation of the increase in the amount of heat dissipation in the intercooler 17 is determined not to be reset in step S120, then the operation will be repeated. On the other hand, if the estimation of the increase in the amount of heat dissipation in the intercooler 17 is determined to be reset, the operation proceeds to step S130, in which the intake-air cooling priority control is reset. Thereafter, the operation returns to step S100.

The following control is performed in step S130. (1) The operation of the three-way valve 25 is controlled to allow the coolant to flow through both the intercooler 17 and the condenser 14. (2) The compressor 21 is operated. (3) The cooler core 15 cools the air without using the cold storage function of the first coolant circuit C1.

The condenser 14 can cool the refrigerant while the intercooler 17 cools the intake air at the same time, so that the air can be cooled in the cooler core 15 by causing the chiller 13 to cool the coolant via the refrigerant. Therefore, the vehicle interior can be cooled without using the cold storage function of the first coolant circuit C1.

In the embodiment, as described in the paragraphs regarding steps S100 and S110, when the increase in the amount of heat dissipation into the coolant at the intercooler 17 is capable of being estimated, the control unit 40 controls the operation of the three-way valve 25 to increase the flow rate of the coolant flowing through the intercooler 17. Specifically, the operation of the three-way valve 25 is controlled to increase the ratio of the flow rate of the coolant flowing through the intercooler 17.

Thus, the flow rate of the coolant flowing through the intercooler 17 can be increased when the increase in the amount of heat dissipation into the coolant at the intercooler 17 is capable of being estimated. Thus, a heat dissipation capacity of the intercooler 17 can be prevented from becoming insufficient when the amount of heat dissipation into the coolant in the intercooler 17 is increased.

In the embodiment, as described in the paragraphs regarding steps S120 and S130, after controlling the operation of the three-way valve 25 to increase the flow rate of the coolant in the intercooler 17, the control unit 40 controls the operation of the three-way valve 25 to decrease the flow rate of the coolant flowing through the intercooler 17 when a decrease in the amount of heat dissipation into the coolant in the intercooler 17 is capable of being estimated. Specifically, the operation of the three-way valve 25 is controlled to decrease the ratio of the flow rate of the coolant flowing through the intercooler 17.

The intercooler 17 can be prevented from obtaining excessive heat dissipation capacity, thereby enabling the condenser 14 to secure its heat dissipation capacity as much as possible.

As described in the paragraphs regarding steps S100 and S110, when the increase in the amount of heat dissipation into the coolant at the intercooler 17 is capable of being estimated, the control unit 40 controls the operation of the three-way valve 25 to prevent the coolant from flowing through the condenser 14.

Thus, when the increase in the amount of heat dissipation into the coolant at the intercooler 17 is capable of being estimated, the flow rate of the coolant flowing through the intercooler 17 can be increased to the utmost. Thus, when the amount of heat dissipation into the coolant at the intercooler 17 is increased, the heat dissipation capacity of the intercooler 17 can be prevented from becoming insufficient as much as possible.

In the embodiment, as described in the paragraphs regarding steps S100 and S110, when the increase in the amount of heat dissipation into the coolant at the intercooler 17 is capable of being estimated, the control unit 40 reduces a refrigerant discharge capacity of the compressor 21. Specifically, the compressor 21 is stopped.

Suppose that the amount of heat dissipation into the coolant at the intercooler 17 is enhanced by increasing the flow rate of the coolant flowing through the intercooler 17. In this case, the amount of heat dissipation required for the condenser 14 can be reduced, thereby further preventing the heat dissipation capacity of the intercooler 17 from becoming insufficient. Since the amount of heat dissipation required for the condenser 14 can be reduced, an excessive rise in the refrigerant pressure in the refrigeration cycle 20 can be prevented.

In the embodiment, after controlling the operation of the three-way valve 25 to increase the flow rate of the coolant in the intercooler 17, the control unit 40 increases the refrigerant discharge capacity of the compressor 21 when a decrease in the amount of heat dissipation into the coolant at the intercooler 17 is capable of being estimated. Specifically, the compressor 21 is actuated.

The intercooler 17 can be prevented from obtaining excessive heat dissipation capacity, thereby enabling the condenser 14 to secure its heat dissipation capacity as much as possible.

In the embodiment, as described in the paragraphs regarding steps S100 and S110, when the increase in the amount of heat dissipation into the coolant at the intercooler 17 is capable of being estimated, the air to be blown into the vehicle interior is cooled by using cold heat stored in the first coolant circuit C1.

Even if the compressor 21 is stopped when an increase in the amount of heat dissipation into the coolant at the intercooler 17 is capable of being estimated, the air to be blown into the vehicle interior can be cooled to thereby maintain the cooling comfort in the vehicle interior.

In the embodiment, the intercooler 17 and the condenser 14 are arranged in parallel with the flow of the coolant.

When the flow rate of the coolant flowing through the intercooler 17 is increased, the flow rate of the coolant flowing through the condenser 14 can be decreased. Thus, the amount of heat dissipation into the coolant in the condenser 14 can be decreased, thereby further preventing the heat dissipation capacity of the intercooler 17 from becoming insufficient when the amount of heat dissipation into the coolant in the intercooler 17 is increased.

Second Embodiment

Figure 4:
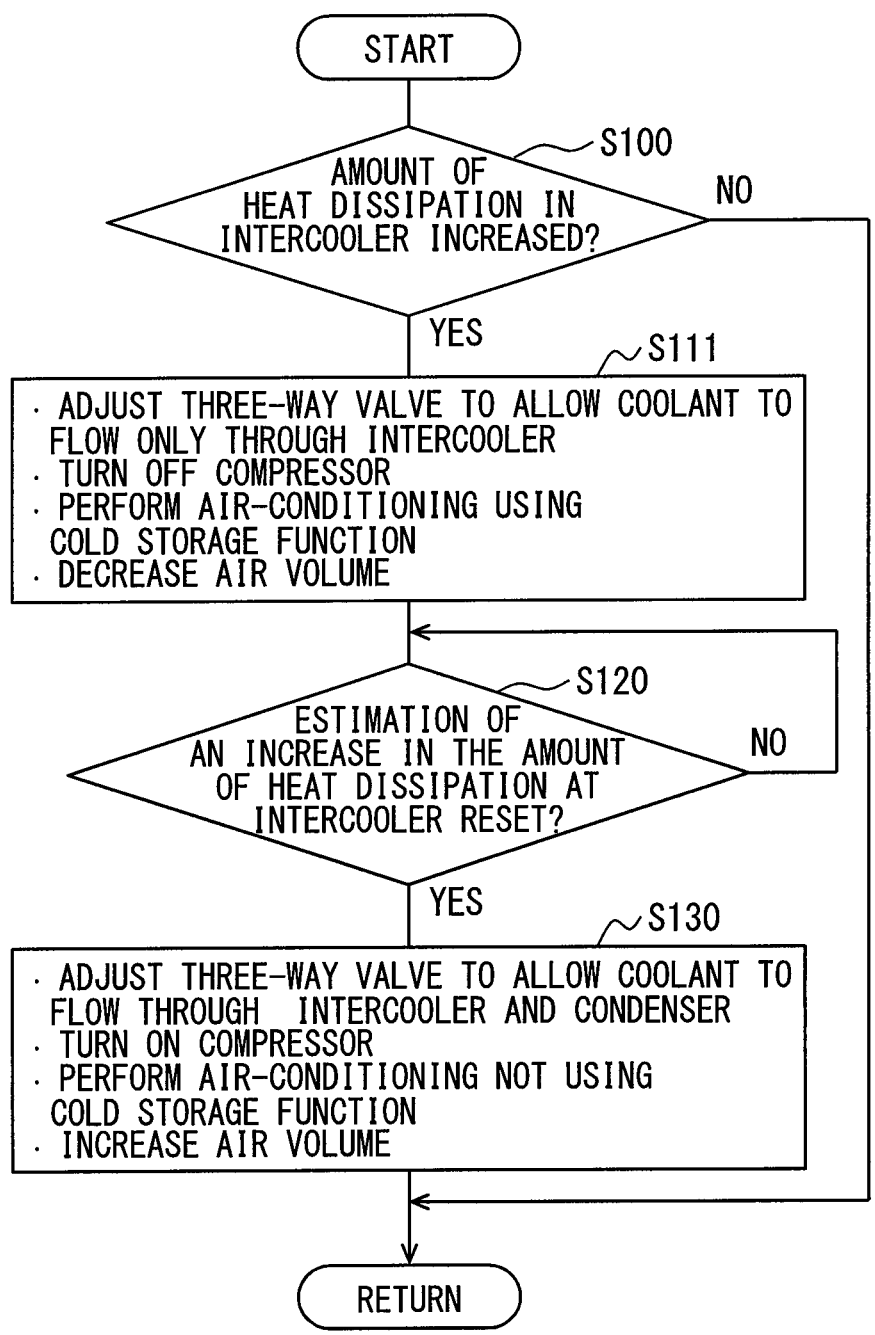
FIG. 4 is a flowchart showing control processing executed by a control unit in a vehicle thermal management device according to a second embodiment.

In the embodiment, as shown in FIG. 4, the intake-air cooling priority control in step S111 is carried out as follows. (1) The operation of the three-way valve 25 is controlled to allow the coolant to flow through the intercooler 17 but not through the condenser 14. (2) The compressor 21 is stopped. (3) The cooler core 15 cools the air by using a cold storage function of the first coolant circuit C1. (4) The volume of air blown by the interior blower 15a is reduced.

Thus, the volume of air flowing through the cooler core 15 is reduced, thereby decreasing the temperature of the air cooled by the cooler core 15. Therefore, the cooling comfort in the vehicle interior can be further maintained.

In step S130, to reset the intake-air cooling priority control, the following control is carried out. (1) The operation of the three-way valve 25 is controlled to allow the coolant to flow through both the intercooler 17 and the condenser 14. (2) The compressor 21 is operated. (3) The cooler core 15 cools the air without using the cold storage function of the first coolant circuit C1. (4) The volume of air blown by the interior blower 15a is increased.

In the embodiment, the control unit 40 reduces the blowing capacity of the blower 15a when the increase in the amount of heat dissipation into the coolant at the intercooler 17 is capable of being estimated.

When the air to be blown into the vehicle interior is cooled by using cold heat stored in the first coolant circuit C1, the flow rate of the air blown into the vehicle interior is reduced, thus decreasing the temperature of the cooled air. Thus, the cooling comfort in the vehicle interior can be further maintained.

In the embodiment, after controlling the operation of the three-way valve 25 to increase the flow rate of the coolant in the intercooler 17, the control unit 40 increases the blowing capacity of the blower 15a while increasing the refrigerant discharge capacity of the compressor 21 when the decrease in the amount of heat dissipation into the coolant at the intercooler 17 is capable of being estimated.

When the air to be blown into the vehicle interior can be cooled by using the chiller 13 and the cooler core 15, the flow rate of the air blown into the vehicle interior can be prevented from being continuously decreased unnecessarily.

Third Embodiment

Figure 5:
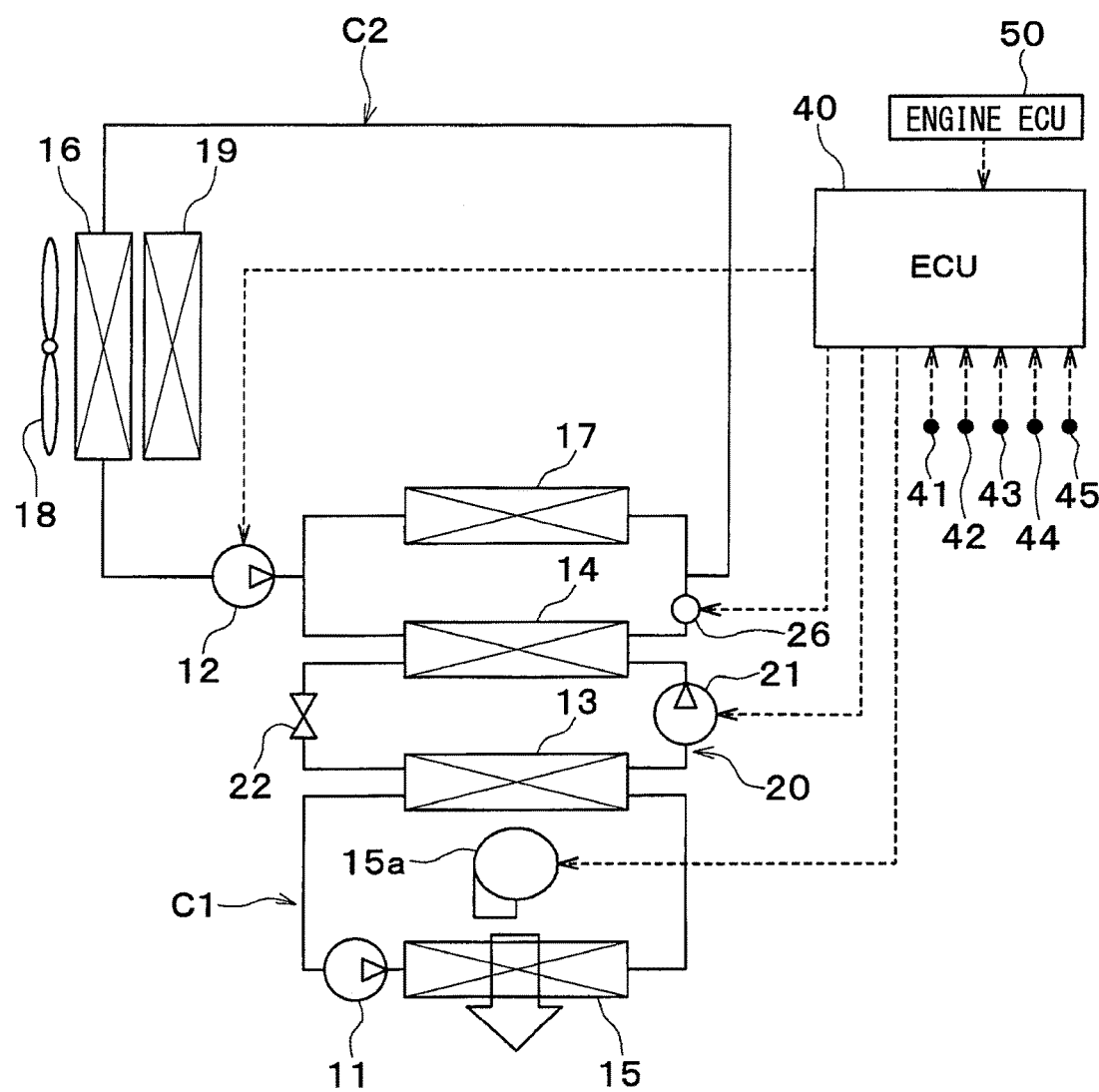
FIG. 5 is an entire configuration diagram of a vehicle thermal management device according to a third embodiment.

Although in the first embodiment, the three-way valve 25 adjusts the flow rate of the coolant flowing through the intercooler 17, in the embodiment, as shown in FIG. 5, a two-way valve 26 adjusts the flow rate of the coolant flowing through the intercooler 17.

The two-way valve 26 is disposed in a coolant flow path on the condenser 14 side, selected from the coolant flow paths (i.e., two coolant flow paths arranged in parallel) on the condenser 14 side and the intercooler 17 side. Thus, the two-way valve 26 adjusts the opening of the coolant flow path on the condenser 14 side. The two-way valve 26 is capable of opening and closing the coolant flow path on the condenser 14 side.

That is, the two-way valve 26 is a flow-rate ratio adjustment device that adjusts the ratio of the flow rate of the coolant flowing through the condenser 14 to that through the intercooler 17. In other words, the two-way valve 26 is a flow-rate adjustment device that adjusts the flow rate of the coolant flowing through the intercooler 17. The operation of the two-way valve 26 is controlled by the control unit 40.

The embodiment can also exhibit the same functions and effects as those in the first embodiment.

Fourth Embodiment

Figure 6:
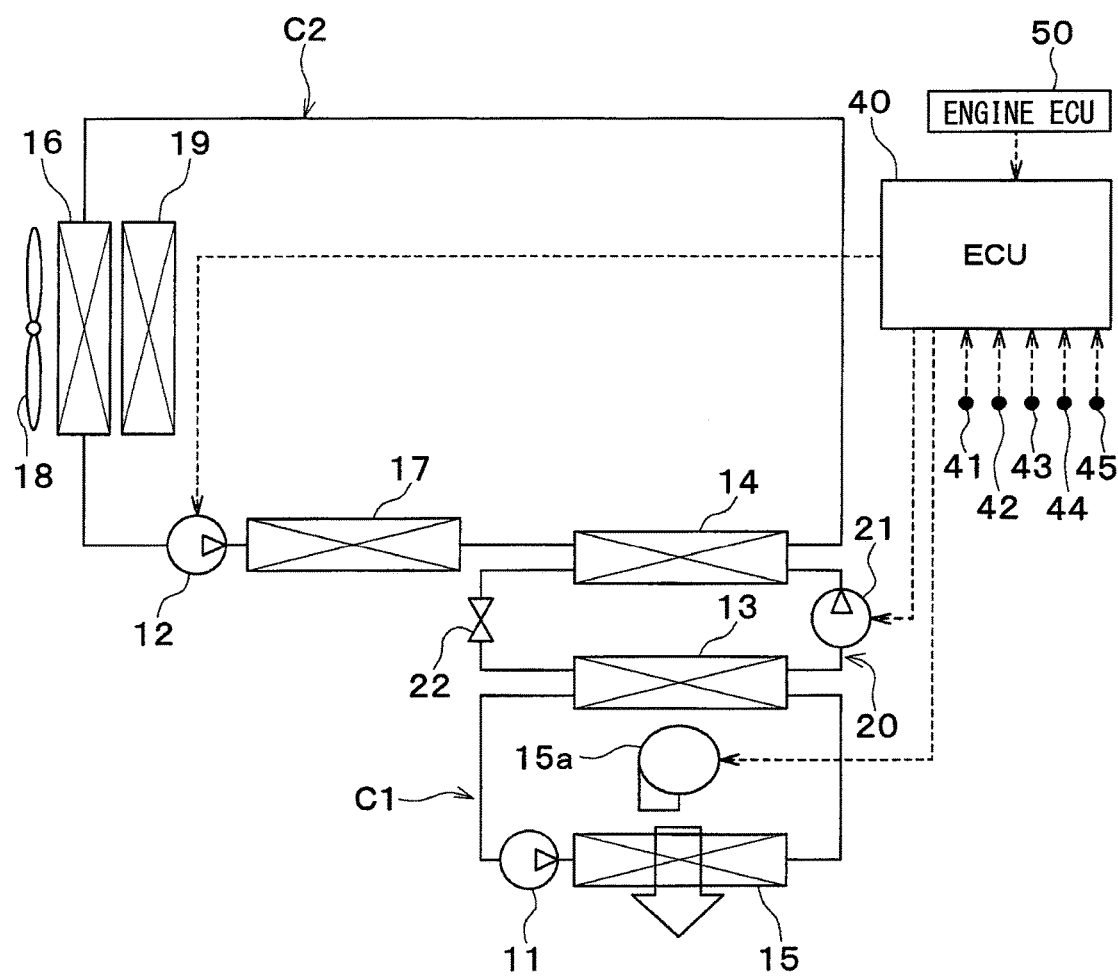
FIG. 6 is an entire configuration diagram of a vehicle thermal management device according to a fourth embodiment.

Although in the above-mentioned embodiment, the condenser 14 and the intercooler 17 are disposed in parallel with each other with respect to the coolant flow, in the embodiment, as shown in FIG. 6, the condenser 14 and the intercooler 17 are arranged in series to each other with respect to the coolant flow. In an example shown in FIG. 6, the intercooler 17 is disposed on the upstream side of the coolant flow of the condenser 14.

Although in the above-mentioned embodiments, the three-way valve 25 adjusts the flow rate of the coolant flowing through the intercooler 17, in the embodiment, the number of revolutions of the second pump 12 is adjusted to control the flow rate of the coolant discharged from the second pump 12, thus adjusting the flow rate of the coolant flowing through the intercooler 17. That is, the second pump 12 is a flow-rate adjustment device that adjusts the flow rate of the coolant flowing through the intercooler 17.

In the embodiment, the control unit 40 increases the discharge capacity of the second pump 12 for the coolant when the increase in the amount of heat dissipation into the coolant at the intercooler 17 is capable of being estimated.

When the amount of heat dissipation into the coolant at the intercooler 17 is increased by increasing the flow rate of the coolant flowing through the intercooler 17, the amount of heat dissipation from the condenser 14 can be reduced, thereby further preventing the discharge capacity of the condenser 14 from becoming insufficient.

In the embodiment, after controlling the operation of the second pump 12 to increase the flow rate of the coolant in the intercooler 17, the control unit 40 decreases the coolant discharge capacity of the second pump 12 when the decrease in the amount of heat dissipation into the coolant at the intercooler 17 is capable of being estimated.

The intercooler 17 can be prevented from obtaining excessive heat dissipation capacity, thereby preventing the power consumption of the second pump 12 from increasing more than necessary.

Figure 7:
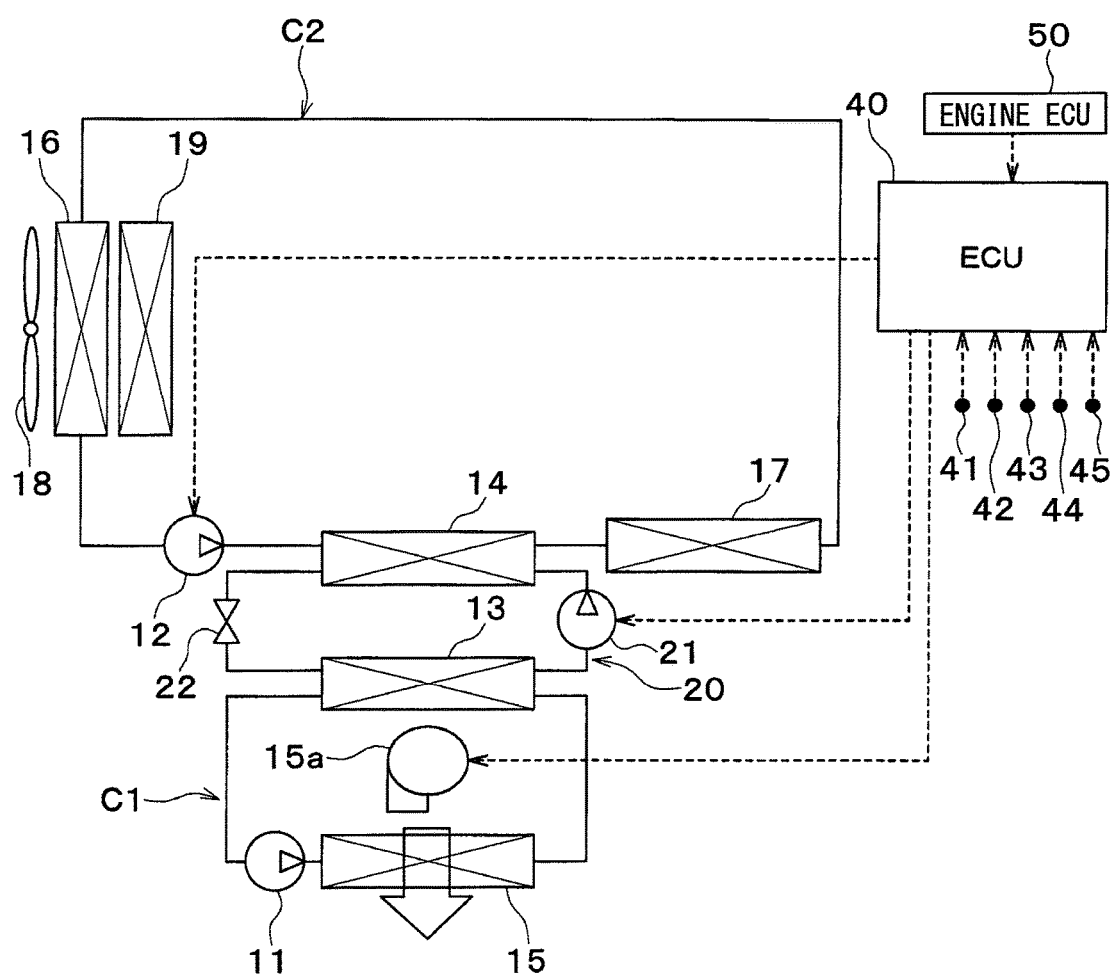
FIG. 7 is an entire configuration diagram of a vehicle thermal management device in a first modified example of the fourth embodiment.

In a first modified example shown in FIG. 7, the intercooler 17 may be disposed on the downstream side of the coolant flow of the condenser 14.

Figure 8:
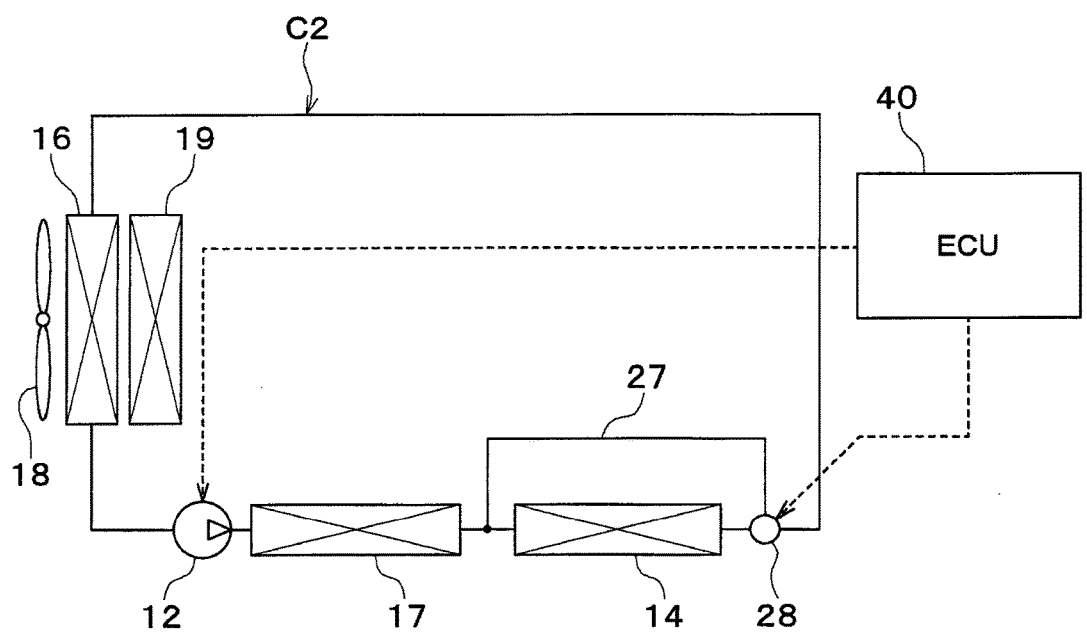
FIG. 8 is an entire configuration diagram of a vehicle thermal management device in a second modified example of the fourth embodiment.

In a second modified example shown in FIG. 8, a condenser bypass flow path 27 and a bypass three-way valve 28 may be provided. The condenser bypass flow path 27 is a flow path that allows the coolant to flow bypassing the condenser 14. The bypass three-way valve 28 is disposed in a merging portion that merges the coolant flow path on the condenser 14 side and the condenser bypass flow path 27. The bypass three-way valve 28 serves to adjust the ratio of the opening of the coolant flow path on the condenser 14 side to that of the condenser bypass flow path 27.

That is, the bypass three-way valve 28 is a flow-rate ratio adjustment device that adjusts the ratio of the flow rate of the coolant flowing through the condenser 14 to that through the condenser bypass flow path 27.

Fifth Embodiment

Figure 9:
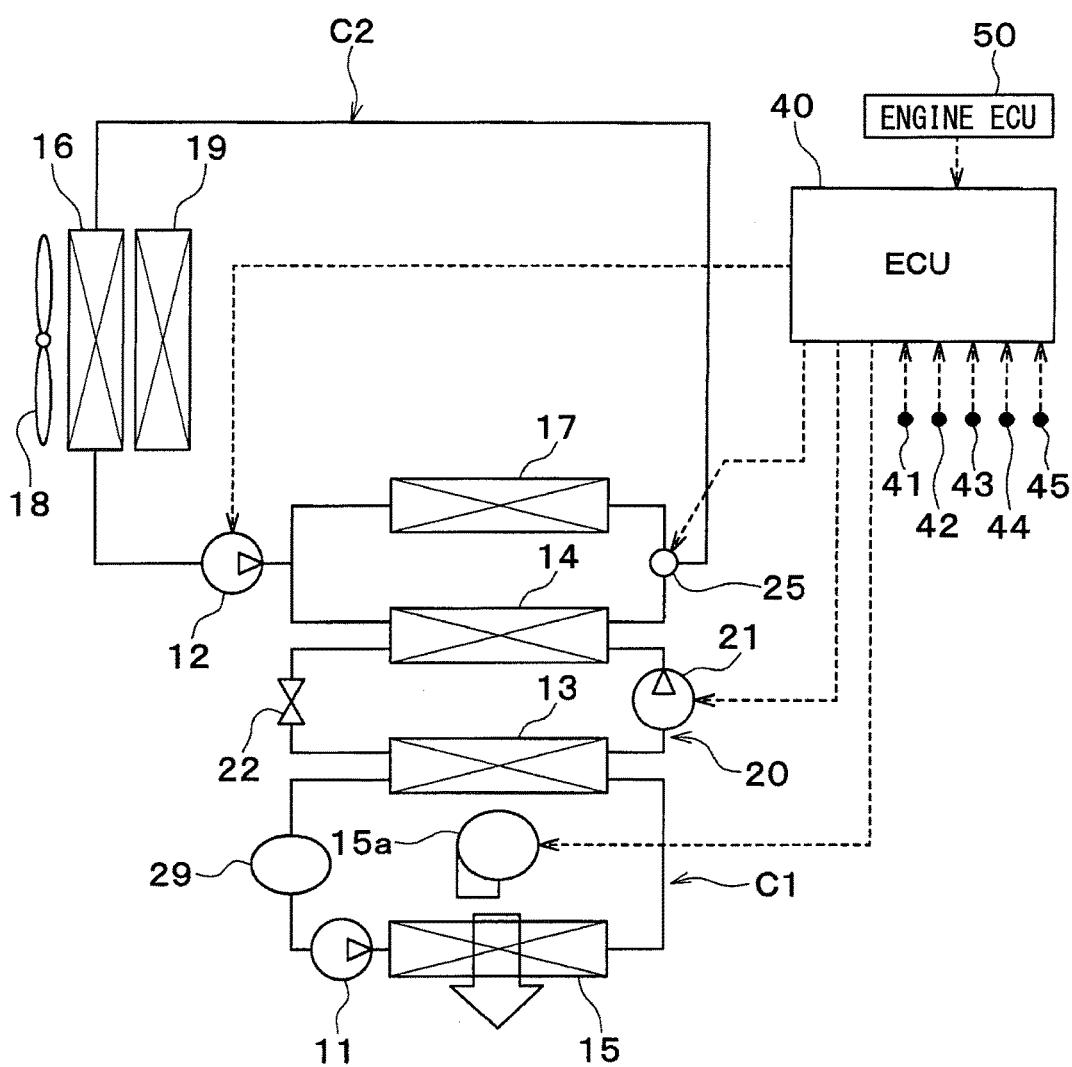
FIG. 9 is an entire configuration diagram of a vehicle thermal management device in a first example according to a fifth embodiment.
Figure 10:
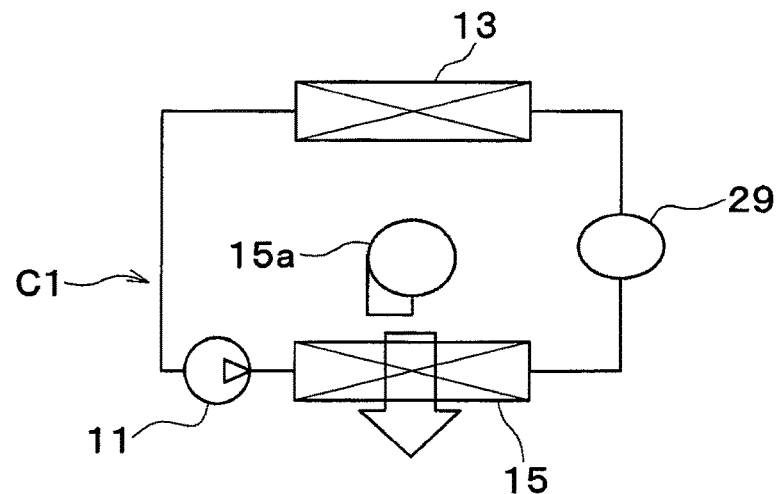
FIG. 10 is an entire configuration diagram of a vehicle thermal management device in a second example of the fifth embodiment.
Figure 11:
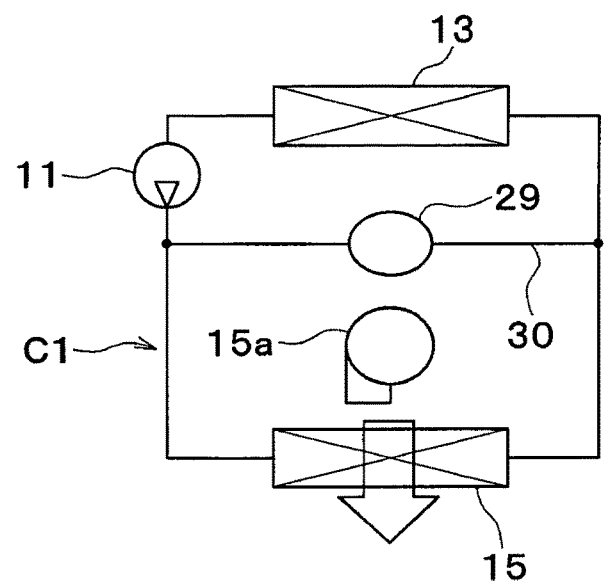
FIG. 11 is an entire configuration diagram of a vehicle thermal management device in a modified example of the fifth embodiment.

In the embodiment, as shown in FIGS. 9 to 11, a cold storage material 29 is disposed in the first coolant circuit C1. The cold storage material 29 is a cold storage device that stores cold heat supplied from the refrigerant by the chiller 13. Examples of the cold storage material include paraffin, sodium acetate hydrate, and the like.

In an example shown in FIG. 9, the cold storage material 29 is disposed on the downstream side of the coolant flow of the chiller 13. That is, the cold storage material 29 is disposed in series with the cooler core 15 with respect to the coolant flow.

In an example shown in FIG. 10, the cold storage material 29 is disposed on the upstream side of the coolant flow of the chiller 13. That is, the cold storage material 29 is disposed in series with the cooler core 15 with respect to the coolant flow.

In an example shown in FIG. 11, the cold storage material 29 is disposed in a cooler core bypass flow path 30. The cooler core bypass flow path 30 is a flow path through which the coolant flows bypassing the cooler core 15. Therefore, the cold storage material 29 is disposed in parallel with the cooler core 15 with respect to the coolant flow.

In the embodiment, when the increase in the amount of heat dissipation into the coolant at the intercooler 17 is capable of being estimated, the air to be blown into the vehicle interior is cooled by using cold heat stored in the cold storage material 29.

Even if the compressor 21 is stopped when the increase in the amount of heat dissipation into the coolant at the intercooler 17 is capable of being estimated, the air to be blown into the vehicle interior can be cooled by using the cold heat stored in the cold storage material 29, thereby maintaining the cooling comfort in the vehicle interior.

The cold storage function of the first coolant circuit C1 can be enhanced by means of the cold storage material 29, thereby further maintaining the cooling comfort in the vehicle interior when stopping the compressor 21.

Sixth Embodiment

Figure 12:
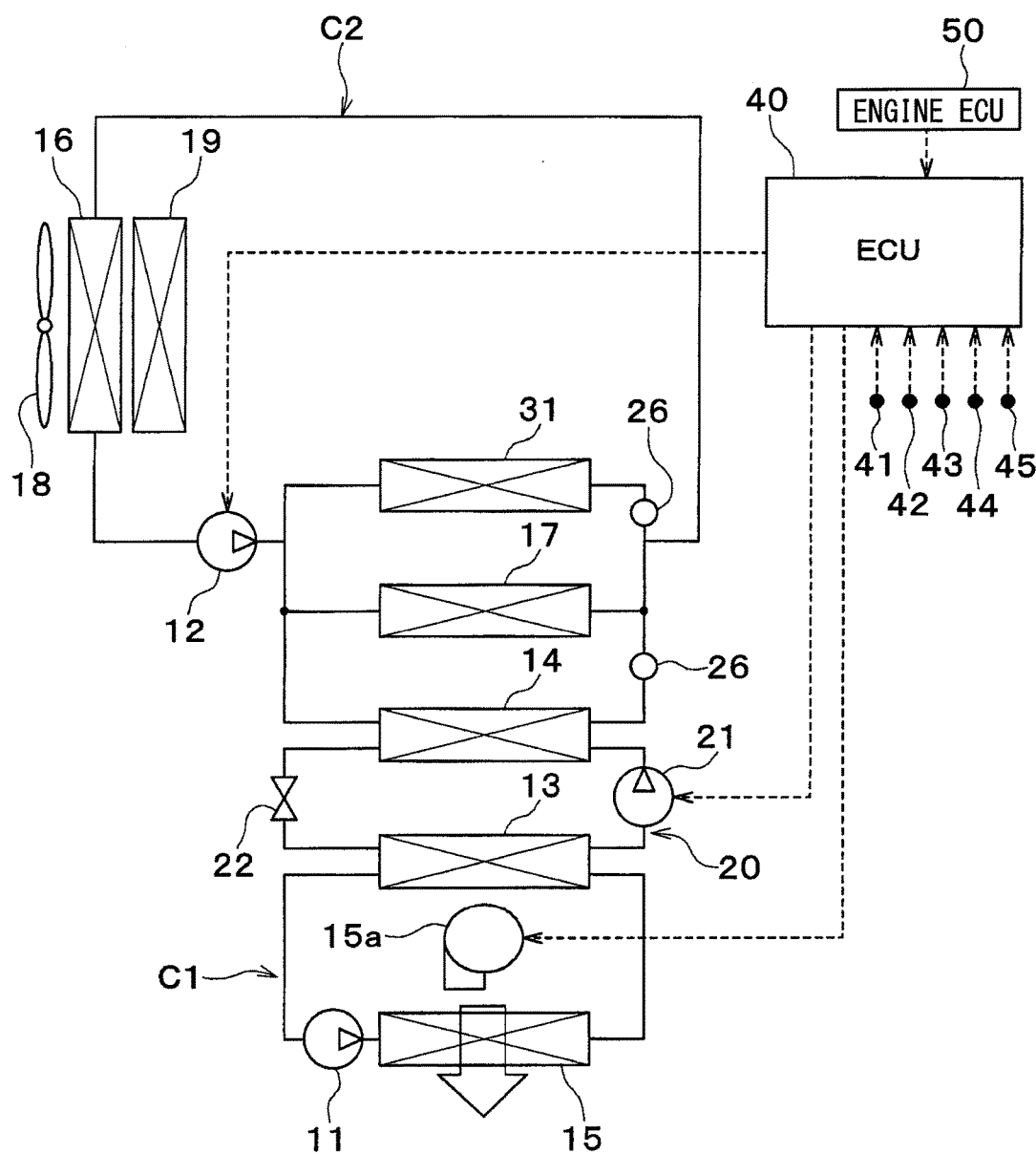
FIG. 12 is an entire configuration diagram of a vehicle thermal management device according to a sixth embodiment.

In the embodiment, as shown in FIG. 12, a heat dissipation device 31 is disposed in the second coolant circuit C2. The heat dissipation device 31 is a device that dissipates heat into the coolant in the second coolant circuit C2. In an example shown in FIG. 12, the heat dissipation device 31 is disposed in parallel with the condenser 14 and the intercooler 17 with respect to the coolant flow.

For instance, in a hybrid vehicle capable of traveling by a driving force obtained from both the engine and a traveling motor, the heat dissipation device 31 is a coolant flow path or a heat exchanger that thermally communicates with the traveling motor, a battery, an inverter, or a DC-DC converter.

The battery is a power storage device that stores power, which is supplied to the traveling motor. The inverter is a power converter that converts a direct-current (DC) power supplied from the battery into an alternating-current (AC) power to output the AC voltage to the traveling motor. The DC-DC converter is a direct-voltage converter that converts a source of direct current (DC).

The opening of the coolant flow path on the condenser 14 side is adjusted by the two-way valve 26. Further, the opening of the coolant flow path on the heat dissipation device 31 side is also adjusted by the two-way valve 26. These two-way valves 26 adjust the distribution ratio of the flow rates in the heat dissipation device 31, the intercooler 17, and the condenser 14 that are disposed in parallel.

Figure 13:
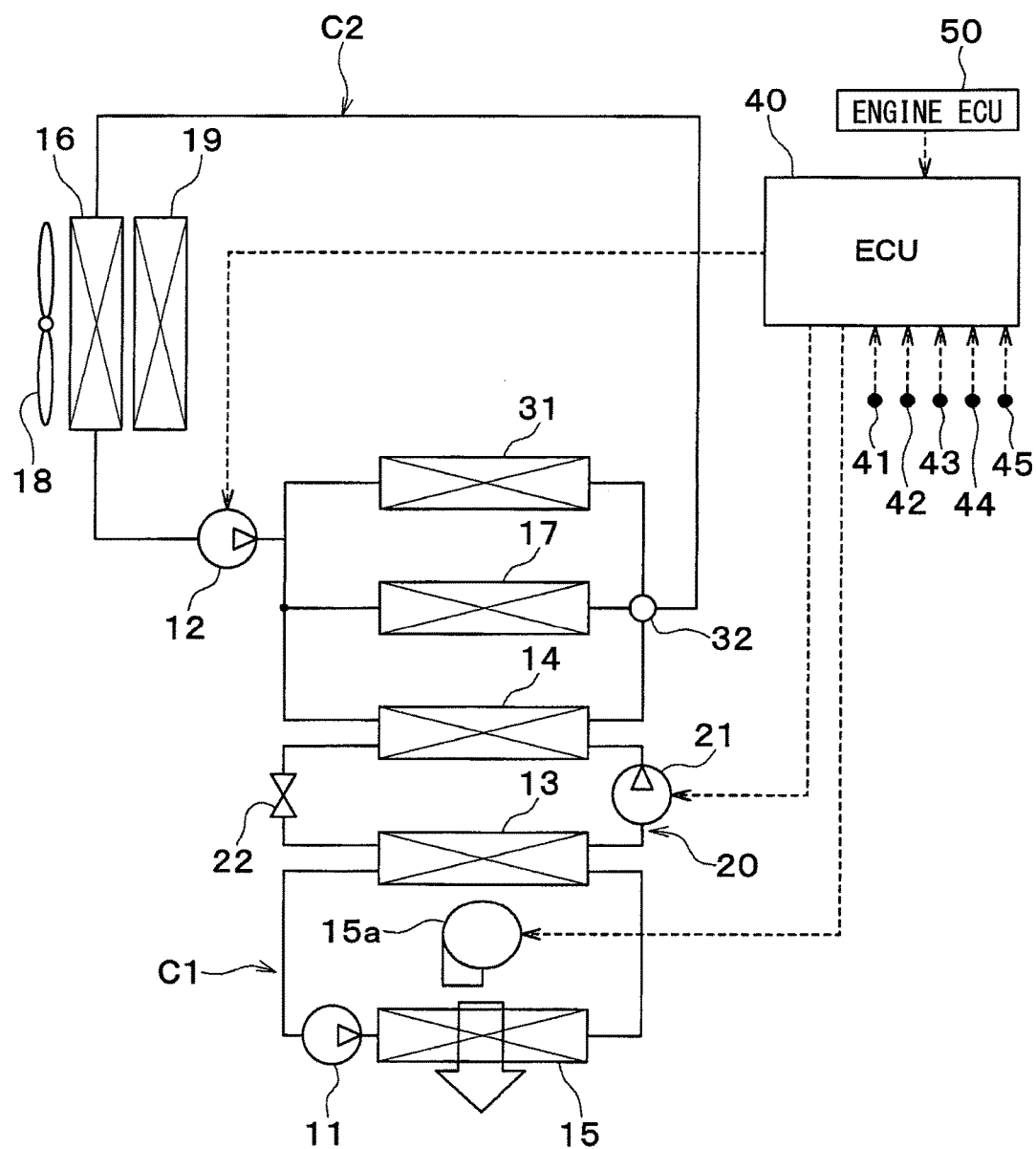
FIG. 13 is an entire configuration diagram of a vehicle thermal management device in a modified example of the sixth embodiment.

In a modified example shown in FIG. 13, one four-way valve 32 may adjust the distribution ratio of the flow rates in the heat dissipation device 31, the intercooler 17, and the condenser 14 that are arranged in parallel.

In the embodiment, when the intake-air cooling priority control is performed in steps S110 and S111 shown in FIGS. 2 and 4, the coolant is allowed to flow through the intercooler 17 while preventing the coolant from flowing through the condenser 14 and the heat dissipation device 31. The embodiment can exhibit the same effects as those in the above-mentioned embodiments.

Other Embodiments

The above-mentioned embodiments can be combined together as appropriate. Various modifications and changes can be made to the above-mentioned embodiments in the following way.

(1) In the above-mentioned embodiments, in steps S110 and S111 shown in FIGS. 2 and 4, the compressor 21 is stopped while preventing the coolant from flowing through the condenser 14. Alternatively, the number of revolutions of the compressor 21 may be decreased while reducing the flow rate of the coolant flowing through the condenser 14.

(2) In the above-mentioned embodiments, as shown in FIGS. 2 and 4, in step S100, it is estimated whether the amount of heat dissipation in the intercooler 17 will increase or not. If the amount of heat dissipation in the intercooler 17 is estimated to increase, the control is performed to give priority to the intake-air cooling in the intercooler 17 in steps S110 and S111. Alternatively, in step S100, it may be determined whether the amounts of heat dissipation in various heat-generating devices, instead of the intercooler 17, will increase. If the amounts of heat dissipation in various heat-generating devices are estimated to increase, in steps S110 and S111, control may be performed to give priority to cooling of various heat-generating devices.

In the hybrid vehicle capable of traveling by the driving force obtained from both the engine and the traveling motor, examples of various heat-generating devices include coolant flow paths or heat exchangers thermally communicating with the traveling motor, battery, inverter, or DC-DC converter, and a heat exchanger.

When the heat-generating device is a coolant flow path or a heat exchanger thermally communicating with the traveling motor, the upper limit of temperature of the traveling motor is not reached because of the improvement in the cooling capacity of the traveling motor, thus improving the drivability. Furthermore, the temperature of the traveling motor is decreased, reducing an electric loss, thereby improving a motor efficiency.

When the heat-generating device is a coolant flow path or a heat exchanger thermally communicating with the battery, the upper limit of the temperature of the battery is not reached because of the improvement in the cooling capacity of the traveling motor, thus improving the drivability.

When the heat dissipation device 31 is a coolant flow path or a heat exchanger thermally communicating with the inverter, the upper limit of temperature of the inverter is not reached because of the improvement in the cooling capacity of the inverter, thus improving the drivability. Furthermore, because the temperature of the inverter is decreased, an electric loss is reduced, thereby improving an inverter efficiency.

When the heat-generating device is a coolant flow path or a heat exchanger thermally communicating with the DC-DC converter, the upper limit of the temperature of the DC-DC converter is not reached because of the improvement in the cooling capacity of the DC-DC converter, thus resulting in an unlimited conversion capacity. Furthermore, the temperature of the DC-DC converter is decreased to reduce an electric loss, thereby the efficiency of the DC-DC converter is improved.

(3) In the above-mentioned embodiments, the low-pressure side heat exchanger in the refrigeration cycle 20 is the chiller 13 that exchanges heat between the refrigerant decompressed and expanded by the expansion valve 22 and the coolant in the first coolant circuit C1. The low-pressure side heat exchanger in the refrigeration cycle 20 may be an evaporator that exchanges heat between the refrigerant decompressed and expanded by the expansion valve 22 and the air to be blown into the vehicle interior.

In the above-mentioned embodiments, the low-pressure side heat exchanger 13 in the refrigeration cycle 20 indirectly exchanges heat between the refrigerant decompressed and expanded by the expansion valve 22 and the air to be blown into the vehicle interior via the coolant in the first coolant circuit C1. The low-pressure side heat exchanger 13 in the refrigeration cycle 20 may directly exchange heat between the refrigerant decompressed and expanded by the expansion valve 22 and the air to be blown into the vehicle interior.

(4) In the first embodiment, the first coolant circuit C1 and the second coolant circuit C2 may be connected together with a switching valve. The switching valve may switch between a state of circulation for the coolant drawn and discharged by the first pump 11 and a state of circulation for the coolant drawn and discharged by the second pump 12, with respect to each of the coolant circulation devices disposed in the first and second coolant circuits C1 and C2.

(5) Although in the above-mentioned embodiments, the coolant is used as the heat medium that passes through the first coolant circuit C1 and the second coolant circuit C2, various kinds of media, including oil, may be used as the heat medium. The heat medium in use may be an ethylene glycol based antifreeze solution, water, air maintained at a certain temperature or higher, or the like.

A nanofluid may be used as the heat medium. The nanofluid is a fluid that contains nanoparticles having a diameter of the order of nanometer. By mixing the nanoparticles into the heat medium, the following functions and effects can be obtained, in addition to the function and effect of decreasing a freezing point, like a coolant (so-called antifreeze) using ethylene glycol.

That is, the use of the nanoparticles can exhibit the functions and effects of improving the thermal conductivity in a specific temperature range, increasing the thermal capacity of the heat medium, preventing the corrosion of a metal pipe and the degradation in a rubber pipe, and enhancing the fluidity of the heat medium at an ultralow temperature.

These functions and effects are varied depending on the configuration, shape, and blending ratio of the nanoparticles, and additive material thereto.

The mixture of nanoparticles in the heat medium can improve its thermal conductivity, and thus even in a small amount, can exhibit substantially the same cooling efficiency, compared with the coolant using ethylene glycol.

Further, since the thermal capacity of the heat medium can be increased, a cold storage heat amount (stored cold heat due to its sensible heat) of the heat medium itself can be increased.

An aspect ratio of the nanoparticle is preferably 50 or more. This is because such an aspect ratio can achieve the adequate thermal conductivity. Note that the aspect ratio of the nanoparticle is a shape index indicating the ratio of the width to the height of the nanoparticle.

Nanoparticles suitable for use include any one of Au, Ag, Cu, and C. Specifically, atoms configuring the nanoparticles can include an Au nanoparticle, an Ag nanowire, a carbon nanotube (CNT), a graphene, a graphite core-shell nanoparticle (a particle body with the above-mentioned atom surrounded by a structure, such as a carbon nanotube), an Au nanoparticle-containing CNT, and the like.

(6) In the refrigeration cycle 20 of the above-mentioned embodiments, a fluorocarbon refrigerant is used as the refrigerant. However, examples of the kind of refrigerant in use are not limited thereto, and may include natural refrigerant, such as carbon dioxide, and a hydrocarbon refrigerant.

The refrigeration cycle 20 in the above-mentioned embodiments configures the subcritical refrigeration cycle in which its high-pressure side refrigerant pressure does not exceed the critical pressure of the refrigerant, but may configure a super-critical refrigeration cycle in which its high-pressure side refrigerant pressure exceeds the critical pressure of the refrigerant.

What is claimed is:

1. A thermal management device comprising:
   two or more heat dissipation devices that dissipate heat into a heat medium;
   a heat medium-air heat exchanger that exchanges heat between air and the heat medium having heat dissipated in the two or more heat dissipation devices;
   a flow-rate adjustment device that adjusts a flow rate of the heat medium flowing through a first heat dissipation device of the two or more heat dissipation devices;
   a compressor that draws and discharges a refrigerant;
   a decompression device that decompresses and expands the refrigerant;
   a low-pressure side heat exchanger that exchanges heat with the refrigerant decompressed and expanded by the decompression device;
   a cold storage device thermally connected to the low-pressure side heat exchanger, the cold storage device being adapted to store cold heat supplied from the refrigerant decompressed and expanded by the decompression device;
   a blower that blows air into the vehicle interior; and
   a control unit configured to estimate an increase or a decrease in amount of heat dissipation into the heat medium at the first heat dissipation device, wherein
   a second heat dissipation device of the two or more heat dissipation devices is a high-pressure side heat exchanger that exchanges heat with the refrigerant discharged from the compressor and then flows out the refrigerant toward the decompression device,
   the low-pressure side heat exchanger is adapted to directly or indirectly exchange heat between the refrigerant decompressed and expanded by the decompression device and air to be blown into a vehicle interior,
   the low-pressure side heat exchanger and the cold storage device are disposed in a first heat medium circuit, the two or more heat dissipation devices are disposed in a second heat medium circuit that is different from the first heat medium circuit,
   the control unit controls the flow-rate adjustment device to increase the flow rate of the heat medium flowing through the first heat dissipation device and reduces a refrigerant discharge capacity of the compressor, if the control unit estimates the increase in the amount of heat dissipation into the heat medium at the first heat dissipation device,
   the cold storage device is adapted to cool the air to be blown into the vehicle interior by using the cold heat stored in the cold storage device, if the control unit estimates the increase in the amount of heat dissipation into the heat medium at the first heat dissipation device, and
   the control unit reduces a blowing capacity of the blower when cooling the air to be blown into the vehicle interior by using the cold heat stored in the cold storage device.

2. The thermal management device according to claim 1, wherein
   the control unit controls the operation of the flow-rate adjustment device to decrease the flow rate of the heat medium flowing through the first heat dissipation device and increases the refrigerant discharge capacity of the compressor, if the control unit estimates a decrease in the amount of heat dissipation into the heat medium at the first heat dissipation device after controlling the operation of the flow-rate adjustment device to increase the flow rate of the heat medium in the first heat dissipation device.

3. The thermal management device according to claim 1, wherein
   the control unit stops operation of the compressor, if the control unit estimates the increase in the amount of heat dissipation into the heat medium at the first heat dissipation device.

4. The thermal management device according to claim 1, wherein
   the control unit increases the blowing capacity of the blower while increasing the refrigerant discharge capacity of the compressor, if the control unit estimates a decrease in the amount of heat dissipation into the heat medium at the first heat dissipation device after controlling the operation of the flow-rate adjustment device to increase the flow rate of the heat medium in the first heat dissipation device.

5. The thermal management device according to claim 1, wherein
   the first heat dissipation device and a remaining heat dissipation device of the two or more heat dissipation devices are arranged in parallel to each other with respect to a flow of the heat medium.

6. The thermal management device according to claim 5, wherein
   the flow-rate adjustment device is a flow-rate ratio adjustment device that adjusts a ratio of the flow rate of the heat medium flowing through the first heat dissipation device to a flow rate of the heat medium flowing through the remaining heat dissipation device, and
   the control unit controls an operation of the flow-rate ratio adjustment device to increase the ratio of the flow rate of the heat medium flowing through the first heat dissipation device, if the control unit estimates the increase in the amount of heat dissipation into the heat medium at the first heat dissipation device.

7. The thermal management device according to claim 6, wherein
   the control unit controls the operation of the flow-rate ratio adjustment device to decrease the ratio of the flow rate of the heat medium flowing through the first heat dissipation device, if the control unit estimates a decrease in the amount of heat dissipation into the heat medium at the first heat dissipation device after controlling the operation of the flow-rate adjustment device to increase the flow rate of the heat medium in the first heat dissipation device.

8. The thermal management device according to claim 6, wherein
the control unit controls the operation of the flow-rate ratio adjustment device to prevent the heat medium from flowing through the remaining heat dissipation device, if the control unit estimates the increase in the amount of heat dissipation into the heat medium at the first heat dissipation device.

9. The thermal management device according to claim 1, wherein
the flow-rate adjustment device is a pump that draws and discharges the heat medium, and
the control unit increases a discharge capacity of the heat medium from the pump, if the control unit estimates the increase in the amount of heat dissipation into the heat medium at the first heat dissipation device.

10. The thermal management device according to claim 9, wherein
the control unit decreases the discharge capacity of the heat medium from the pump, if the control unit estimates a decrease in the amount of heat dissipation into the heat medium at the first heat dissipation device.

11. A thermal management device comprising:
at least first and second heat dissipation devices configured to dissipate heat into a heat medium;
a heat medium-air heat exchanger that exchanges heat between air and the heat medium having heat dissipated in the first heat dissipation device;
a flow-rate adjustment valve configured to adjust a flow rate of the heat medium flowing through the first heat dissipation device;
a compressor that draws and discharges a refrigerant;
a decompression device that decompresses and expands the refrigerant;
a low-pressure side heat exchanger that exchanges heat with the refrigerant decompressed and expanded by the decompression device;
a cold storage device thermally connected to the low-pressure side heat exchanger, the cold storage device being adapted to store cold heat supplied from the refrigerant decompressed and expanded by the decompression device;
a blower configured to blow air into the vehicle interior; and
a control unit configured to estimate an increase or a decrease in amount of heat dissipation into the heat medium at the first heat dissipation device, wherein
the second heat dissipation device is a high-pressure side heat exchanger that exchanges heat with the refrigerant discharged from the compressor and then flows out the refrigerant toward the decompression device,
the low-pressure side heat exchanger is adapted to directly or indirectly exchange heat between the refrigerant decompressed and expanded by the decompression device and air to be blown into a vehicle interior,
the low-pressure side heat exchanger and the cold storage device are disposed in a first heat medium circuit, and the first and second heat dissipation devices are disposed in a second heat medium circuit that is different from the first heat medium circuit,
the control unit controls the flow-rate adjustment valve to increase the flow rate of the heat medium flowing through the first heat dissipation device and reduces a refrigerant discharge capacity of the compressor, if the control unit estimates the increase in the amount of heat dissipation into the heat medium at the first heat dissipation device, and
the cold storage device is adapted to cool the air to be blown into the vehicle interior by using the cold heat stored in the cold storage device and the control unit reduces a blowing capacity of the blower, if the control unit estimates the increase in the amount of heat dissipation into the heat medium at the first heat dissipation device.

12. The thermal management device according to claim 1, wherein the flow-rate adjustment device is a valve.

* * * * *